(12) United States Patent
Ono et al.

(10) Patent No.: US 12,020,094 B2
(45) Date of Patent: Jun. 25, 2024

(54) IMAGE PROCESSING DEVICE, PRINTING SYSTEM, AND NON-TRANSITORY COMPUTER-READABLE STORAGE MEDIUM STORING IMAGE PROCESSING PROGRAM THAT RENDER THREE DIMENSIONAL (3D) OBJECT

(71) Applicant: SEIKO EPSON CORPORATION, Tokyo (JP)

(72) Inventors: Takuya Ono, Nagano (JP); Takahiro Kamada, Nagano (JP); Mitsuhiro Yamashita, Nagano (JP); Yuko Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/483,554

(22) Filed: Oct. 10, 2023

(65) Prior Publication Data
US 2024/0127018 A1    Apr. 18, 2024

(30) Foreign Application Priority Data

Oct. 12, 2022    (JP) ................................ 2022-163927

(51) Int. Cl.
*H04N 1/23*    (2006.01)
*G06K 15/02*    (2006.01)
(Continued)

(52) U.S. Cl.
CPC ..... *G06K 15/1849* (2013.01); *G06K 15/1825* (2013.01); *G06K 15/1842* (2013.01); *G06K 15/1844* (2013.01); *H04N 1/2323* (2013.01); *H04N 1/233* (2013.01); *H04N 1/387* (2013.01); *H04N 1/407* (2013.01)

(58) Field of Classification Search
None
See application file for complete search history.

(56) References Cited

U.S. PATENT DOCUMENTS

2009/0303341 A1*  12/2009  Mikawa ............... H04N 1/6027
                                                      348/222.1
2011/0007333 A1*  1/2011  Ishii ........................ H04N 1/60
                                                      358/1.9
(Continued)

FOREIGN PATENT DOCUMENTS

JP          2014-194713 A        10/2014

*Primary Examiner* — Henok Shiferaw
(74) *Attorney, Agent, or Firm* — Global IP Counselors, LLP

(57) ABSTRACT

An image processing device includes an image data acquisition section configured to acquire image data of an image to be printed on a print medium; a parameter acquisition section configured to acquire parameters for performing physical based rendering of the print medium on which the image is to be printed as a 3D object, the parameters including a normal line map representing a normal line direction of an irregularities surface of the print medium related to a reflection direction of light incident on the print medium; a correction section configured to correct strength of an application effect of the normal line map corresponded with the 3D object; and a rendering execution section for generating a rendering image representing the print medium on which the image is printed by executing the physical based rendering using the image data and the parameters.

11 Claims, 13 Drawing Sheets

(51) Int. Cl.
*H04N 1/387* (2006.01)
*H04N 1/407* (2006.01)

(56) References Cited

U.S. PATENT DOCUMENTS

| | | | |
|---|---|---|---|
| 2014/0293341 A1 | 10/2014 | Yasutomi | |
| 2019/0279402 A1* | 9/2019 | Panetta | ................... G06T 7/10 |
| 2022/0345675 A1* | 10/2022 | Zhang | ................... H04N 9/67 |

* cited by examiner

GLOSSY PAPER

MATTE PAPER

IMAGE PROCESSING DEVICE, PRINTING SYSTEM, AND NON-TRANSITORY COMPUTER-READABLE STORAGE MEDIUM STORING IMAGE PROCESSING PROGRAM THAT RENDER THREE DIMENSIONAL (3D) OBJECT

The present application is based on, and claims priority from JP Application Serial Number 2022-163927, filed Oct. 12, 2022, the disclosure of which is hereby incorporated by reference herein in its entirety.

BACKGROUND

1. Technical Field

The present disclosure relates to an image processing device, a printing system, and an image processing program.

2. Related Art

JP-A-2014-194713 discloses a method of creating parameters for reproducing texture of a print sheet based on the brightness of each pixel of a captured image obtained by capturing an image of the print sheet with a digital camera, and causing a display device to display a print preview in which the reflection of lighting on the print sheet is reproduced.

When a captured image is used to create parameters for reproducing texture of a print medium, a print preview is influenced by capturing environment such as orientation of a camera and shape of lighting. Therefore, in a case where observation environment and the capturing environment reproduced in the print preview are different, the texture of the print medium may not be sufficiently reproduced. Therefore, there is a desired for a technique capable of reproducing the texture of the print medium without restricting the observation environment.

SUMMARY

According to a first aspect of the present disclosure, an image processing device is provided.

This image processing device includes an image data acquisition section configured to acquire image data of an image to be printed on a print medium; a parameter acquisition section configured to acquire parameters for performing physical based rendering of the print medium on which the image is to be printed as a three dimensional (hereinafter referred to as 3D) object, the parameters including a normal line map representing a normal line direction of an irregularities surface of the print medium related to a reflection direction of light incident on the print medium; a correction section configured to correct strength of an application effect of the normal line map corresponding to the 3D object; and a rendering execution section configured to, by executing the physical based rendering using the image data and the parameters, generate a rendering image representing the print medium on which the image is printed.

According to a second aspect of the present disclosure, a printing system is provided.

This printing system includes the image processing device according to the first aspect; a display section configured to display the rendering image generated by the image processing device; and a printing device configured to print the image data.

According to a third aspect of the present disclosure, an image processing program is provided.

A non-transitory computer-readable storage medium storing an image processing program implemented by a computer to generate a rendering image of a print medium on which an image is printed, the program includes a function of obtaining image data of an image to be printed on a print medium; a function of acquiring parameters for performing physical based rendering of the print medium as a 3D object on which the image is to be printed, the parameters including a normal line map representing a normal line direction of an irregularities surface of the print medium related to a reflection direction of light incident on the print medium; a function of correcting strength of an application effect of the normal line map corresponding to the 3D object; and a function of, by executing the physical based rendering using the image data and the parameters, generating a rendering image representing the print medium on which the image is printed.

DESCRIPTION OF EMBODIMENTS

A. First Embodiment (A1) Hardware Configuration

Figure 1:
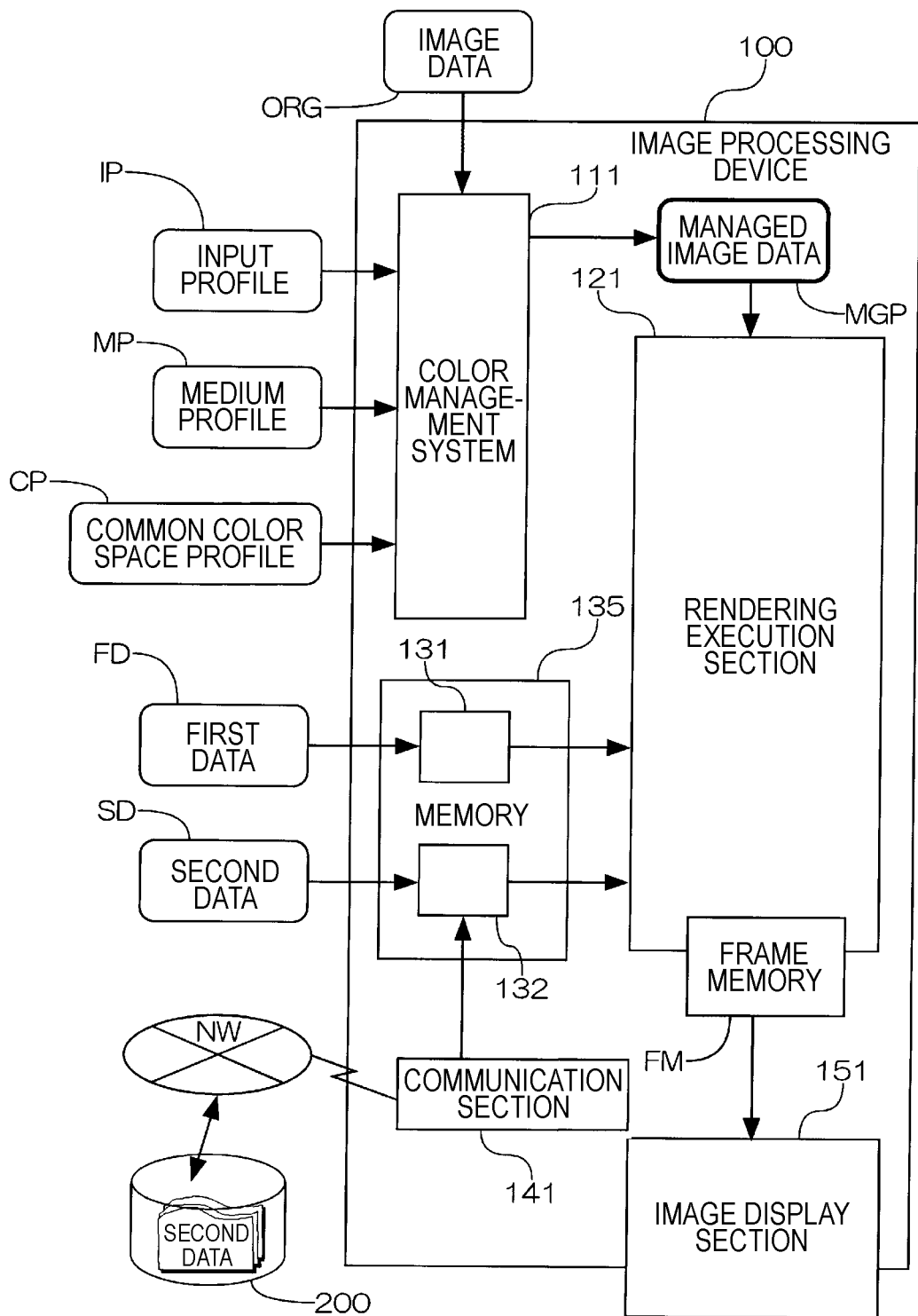
FIG. 1 is a schematic configuration diagram showing an image processing device according to an embodiment.

FIG. 1 shows a schematic configuration of an image processing device 100 of the present embodiment. The image processing device 100 performs image processing for previewing an image printed on a predetermined print medium. The image processing device 100 not only performs image processing, but also displays the processing result as a preview image. As shown in FIG. 1, the image processing device 100 includes a color management system 111 that mainly performs color conversion, a rendering execution section 121 that executes rendering of the print medium, a memory 135 including a first storage section 131 and a second storage section 132, a communication section 141 that exchanges data with a site 200 of external via a network NW such as the Internet, and an image display section 151 that displays the preview image. Note that a program for performing each process (to be described later) is stored in the memory 135 or the like of the image processing device 100, and each function of the image processing device 100 is realized by a CPU or a GPU executing the program stored in the memory.

The color management system may hereinafter be abbreviated as CMS for brevity. The CMS 111 acquires image data ORG representing an image to be printed (hereinafter, referred to as an original image). The CMS 111 may acquire the image data ORG from an image forming device that generated the image data ORG via wired or wireless communication, may acquire the image data ORG from a storage medium such as a memory card that stores the image data ORG, or may acquire the image data ORG via a network. The CMS 111 may acquire the image data ORG generated in the image processing device 100. The image data ORG acquired by the CMS 111 is supplied to a printing device (not shown) connected to the image processing device 100 via the wired or the wireless communication, and is printed on the print medium by the printing device. The image data ORG may be supplied from the image processing device 100 to the printing device via the storage medium such as a memory card. The CMS 111 may be referred to as an image data acquisition section.

The CMS 111 performs color conversion on the image data ORG, and converts the color into a color to be expressed on the print medium by printing. The image data ORG subjected to the color conversion is called managed image data MGP. Details of the CMS 111 process will be described later. The managed image data MGP is used as a texture of the print medium represented by a 3D object. Input profile IP, medium profile MP, common color space profile CP, and the like are input to the CMS 111. The input profile IP is used to perform conversion from a device-dependent color system such as RGB to a device-independent color system such as L*a*b* (hereinafter simply referred to as Lab). The medium profile MP is a profile representing color reproducibility when a specific printing device such as a printer prints on specific print medium under printing conditions such as a specific printing resolution, and is a profile for converting a color value between the device-independent color system and the device-dependent color system. The medium profile MP includes information other than the print medium, such as print settings of the printing device. For this reason, if all combinations of printing devices (printers)×print medium×print settings are to be covered, the number of types of medium profiles MP increases. Therefore, in a case where the dependency of the printing conditions is small or in a case where it is not desired to increase the number of profiles, the medium profiles MP may be composed as a combination of printing devices (printers)×print medium. In this way, since the characteristics of the printing device and the characteristics of the print medium itself are involved in the color of the image on the print medium (medium), the medium profile MP may be referred to as a printing profile MP below.

When the input profile IP is applied to the image data ORG and the printing profile MP is further applied, the color value is obtained for a case where printing is performed under specific printing conditions, that is, for a case depending on the printing device or the print medium. When the printing profile MP is applied to convert the color value of this image from the device-dependent color system to the device-independent color system, and the common color space profile CP is further applied, the color value is converted into an expression in the second color space (here, the sRGB color space) used for rendering. Since the color value is once converted into the color value depending on the characteristics of the printing device, the print medium, and the like by using the printing profile MP, the image data ORG is color conversion into a range of the color value that can be actually printed. The common color space profile CP is used to convert the image data ORG into the color values of the color space used in rendering. Although the sRGB color space is representative as the common color space, AdobeRGB, Display-P3, or the like may be used.

As described above, the CMS 111 uses each profile to convert the image data ORG expressed in the first color space, which is a device-dependent color system, into the image data MGP (managed image data) expressed in the sRGB color space, which is a second color space used in rendering. Here, the converted image data MGP is not limited to the color value of the sRGB color space, and may be expressed in any color space as long as it is expressed in a color space that can be handled by the rendering execution section 121. For example, when the rendering execution section 121 adopts a configuration capable of rendering based on the color value in the Lab or XYZ color space, spectral reflectance, or the like, the image data may be converted into color values to be used for display on the image display section 151 in a lighting process (to be described later) performed in the rendering execution section 121 or in a post processing section (to be described later) disposed after the rendering execution section 121.

The memory 135 captures and stores first data FD in the first storage section 131, and captures and stores second data SD in the second storage section 132. The first data FD and the second data SD are parameters necessary for expressing a print medium on which the image is printed by physical based rendering. The first data FD includes 3D object information relating to a form of the 3D object which is the 3D object express the print medium and is arranged in a virtual space, camera information relating to the positions of cameras arranged in the virtual space, lighting information relating to the positions and colors of light sources arranged in the virtual space, background information relating to the background expressed in the virtual space, and the like. The second data SD includes data for expressing the texture of the print medium on the 3D object. The first data FD and the second data SD are used at the time of rendering in the rendering execution section 121.

For the first data FD and the second data SD, representative data having a use frequency equal to or higher than a predetermined use frequency may be stored in advance in a nonvolatile manner in the first storage section 131 and the second storage section 132, selected as necessary, and may be referred to by the rendering execution section 121. Texture data or the like in the case of using a print medium which is not normally used and whose use frequency is low, for example, a special material such as a fabric material, a can, or a plastic sheet may be stored in the site 200 of external and may be acquired via the communication section 141 when necessary. The first data FD such as the lighting information may be designated individually by the user at the time of rendering, or a representative camera angle and a light source may be stored in the first storage section 131 in advance and used. The camera angle refers to a position and a direction in which the user is looking at the print medium as an object, and corresponds to a position of a virtual viewpoint and a direction of a virtual line of sight of the user looking at the virtual space. For this reason, the camera may sometimes be described as a "viewpoint" or a "view" as the viewpoint or the direction of the line of sight. A portion that acquires the parameters from the outside of the image processing device 100 may be referred to as a parameter acquisition section.

The image display section 151 displays the image of the print medium rendered by the rendering execution section 121 together with the background and the like. The image display section 151 reads out the image data for display from a frame memory FM provided in the rendering execution section 121, and displays the image data. The image display section 151 may be provided in the image processing device 100, or may be provided separately from the image processing device 100. Note that the image processing device 100 may be realized as a dedicated machine, or may be realized by causing a computer to execute an application program. Of course, the computer includes a terminal such as a tablet or a mobile phone. Since the process of the rendering execution section 121 requires considerable resources and computing power, the image processing device 100 may be configured such that only the rendering execution section 121 is executed by a CPU capable of high-speed process or a dedicated GPU, and the rendering execution section 121 is positioned at another site on the network. The image display section 151 may be referred to as a display section.

The color conversion process performed by the CMS 111 will be described with reference to FIG. 2A. The figure is a flowchart showing a process of converting the original image data ORG into a color data of a common color space for rendering by the CMS 111. When the color conversion process is started, the original image data ORG and the input profile IP are input, and the original image data ORG represented by the device-dependent color system (for example, the RGB color system) is converted into color data of the device-independent color system (for example, the Lab or XYZ color system) (step S110). Next, it is determined whether or not a medium profile MP is prepared (step S120), and if there is a medium profile MP, this is applied, and color conversion into a range of colors expressible by printing is performed in consideration of a combination of printing devices (printers)×print medium as the printing conditions (step S130). If there is no medium profile MP, the process of step S130 is not performed. Then, using the common color space profile CP, it is converted into color value in the common color space, which is the second color space used for rendering (step S150). In the present embodiment, sRGB is used as the common color space. The managed image data MGP thus obtained is set to the albedo color, which is the texture of the 3D object (step S160), and this process routine ends.

In step S130, if the rendering intent of the color conversion of the medium profile is set to absolute, the color (ground color) of the print medium itself can be reflected. When the color value of the image to be subjected to the color conversion in step S150 is out of a gamut of the sRGB color space, the color value may be approximated to a value in the sRGB color space, or may be treated so as to take a value out of the gamut of the sRGB color space. The RGB values of the image data are generally stored as 8 bits for each color, that is, integers of values 0 to 255, but instead of this, if the pixel values are represented as floating points of values 0.0 to 1.0, values outside the color gamut of sRGB can be handled as negative values or values exceeding 1.0.

Figure 2A:
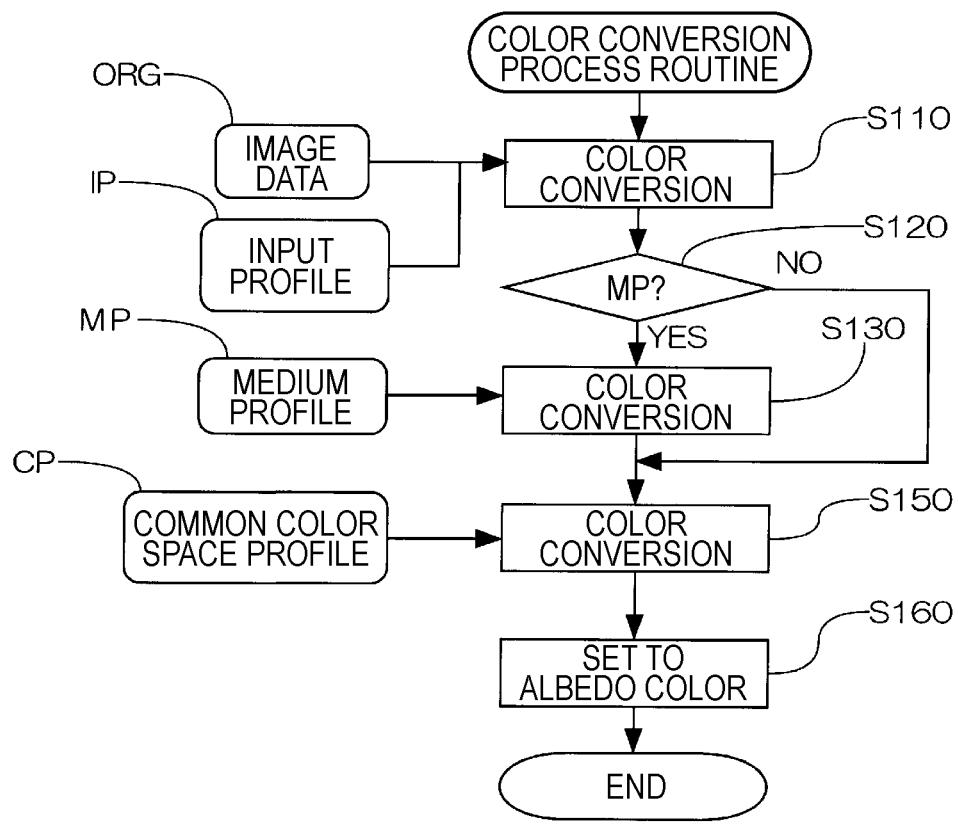
FIG. 2A is a flowchart showing an outline of a color conversion process.
Figure 2B:
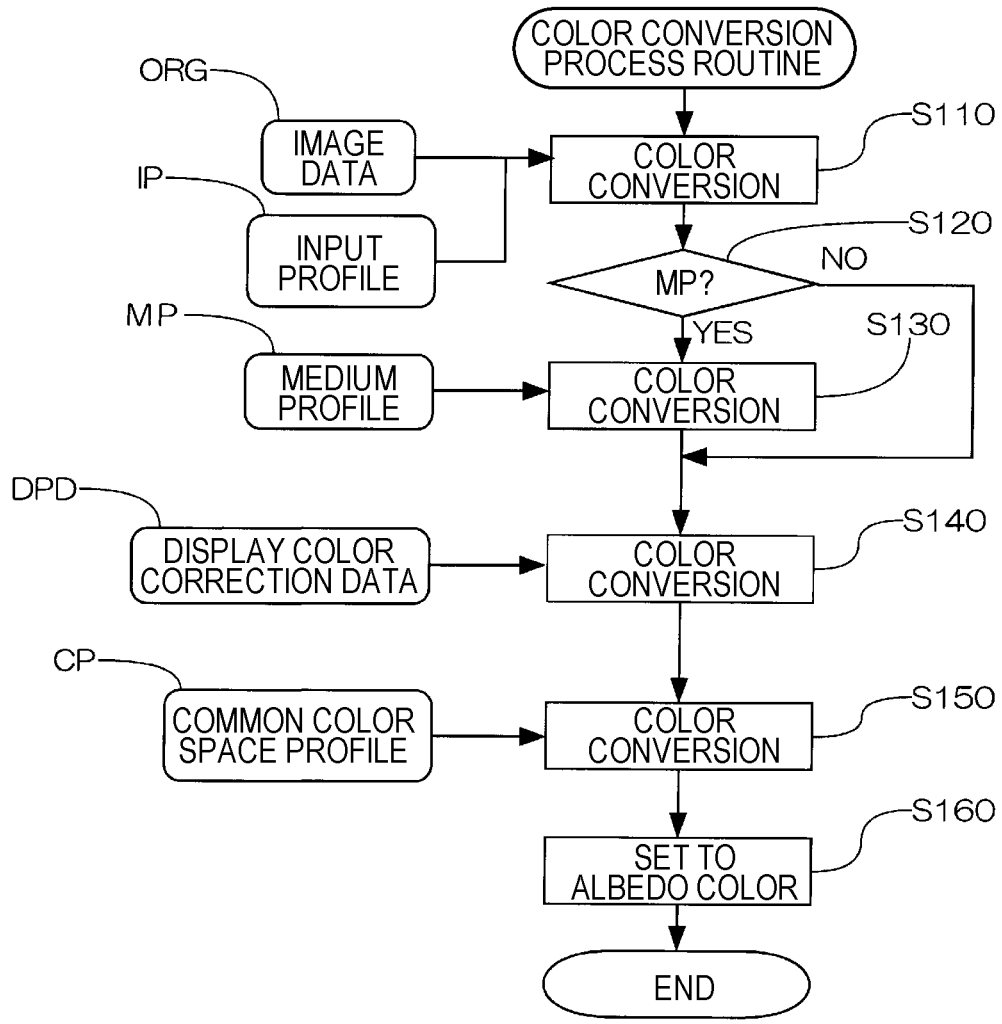
FIG. 2B is a flowchart showing another configuration example of the color conversion process.
Figure 2C:
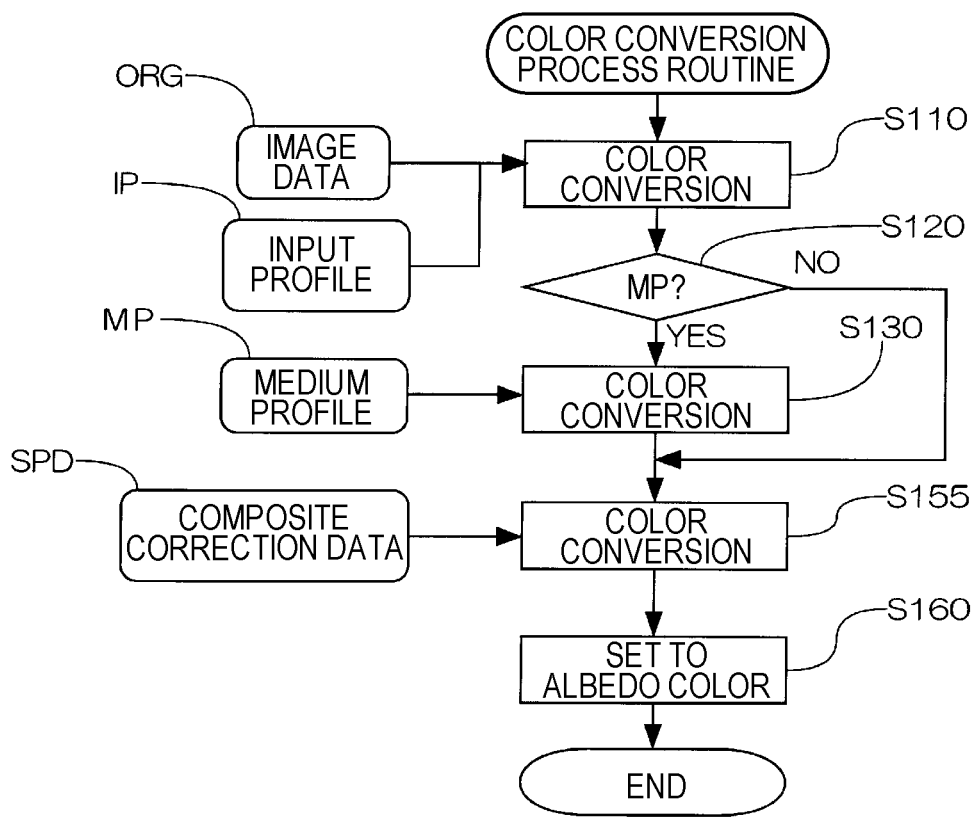
FIG. 2C is a flowchart showing another configuration example of the color conversion process.

The color conversion by CMS 111 is not limited to the configuration shown in FIG. 2A, and may be performed by, for example, the configuration shown in FIG. 2B or FIG. 2C. FIG. 2B shows a color conversion process routine in the case where correction data DPD for the image display section 151 is prepared. Display device correction data DPD is data for correcting the deviation of display color of the image display section 151 with respect to sRGB, which is the common color space. In the color conversion process shown in FIG. 2B, after the color conversion (step S130) using the medium profile MP, the color conversion process (step S140) is performed using the display device correction data DPD.

The composite correction data SPD may be prepared by composing such display device correction data DPD and the common color space profile CP in advance, and the color conversion by the composite correction data SPD (step S155) may be performed instead of the color conversion by the common color space profile CP (step S150). An example of the color conversion process in this case is shown in FIG. 2C. Note that a correction for a shift in the display color of the image display section 151 may be performed by a post processing section PST after a render backend shown in FIG. 3 (to be described later), instead of being performed by the CMS 111.

Figure 3:
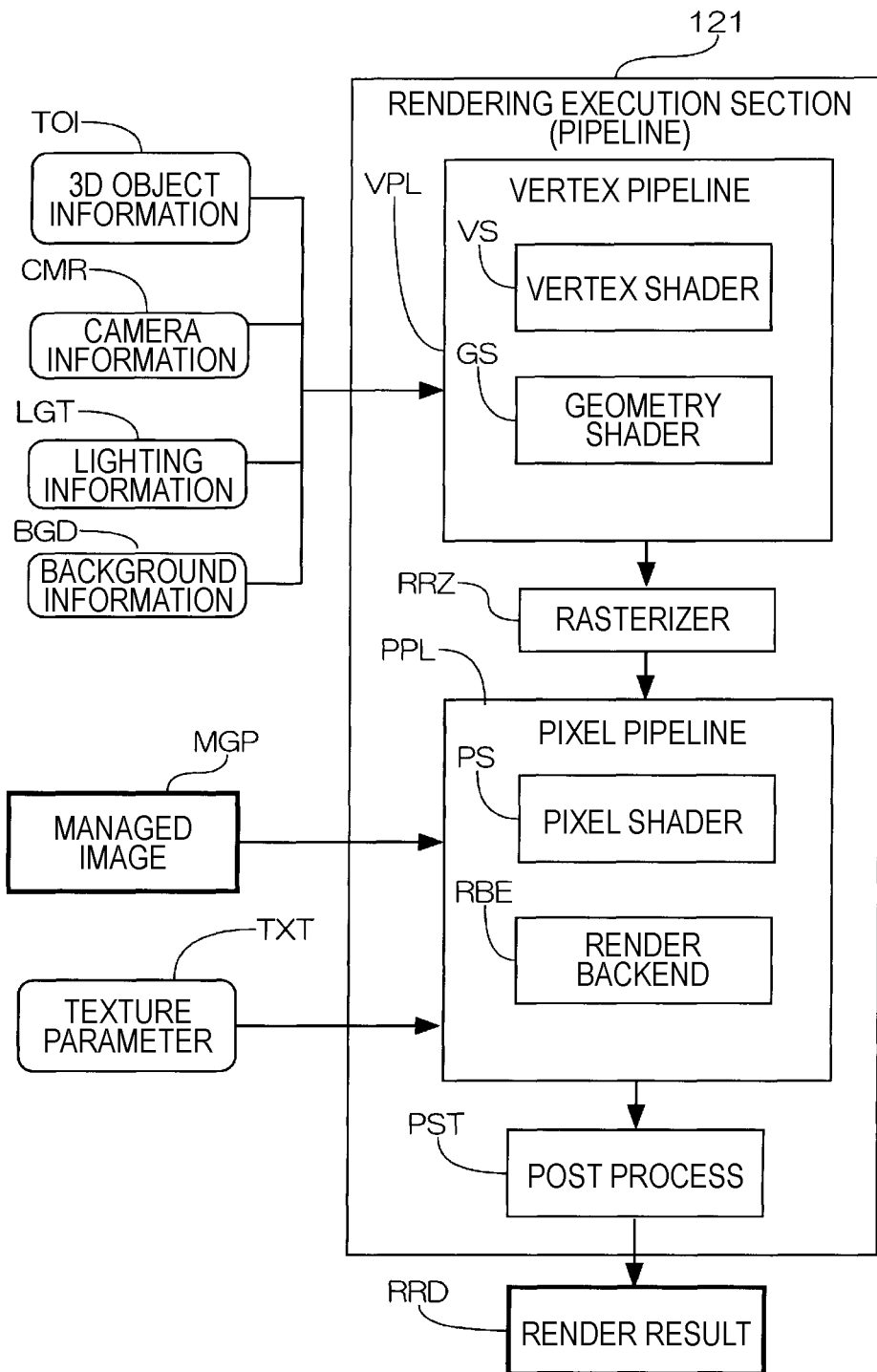
FIG. 3 is an explanatory diagram showing a logic configuration of the rendering execution section of the embodiment.

The rendering execution section 121 renders the managed image data MGP output by the CMS 111 after color conversion, so that the image display section 151 displays how the print medium on which the original image data ORG is printed appears in the virtual space. FIG. 3 shows a configuration example of the rendering execution section 121. This rendering execution section 121 shows a typical configuration for performing a physical based rendering process, and other configurations can be adopted. The rendering execution section 121 of the present embodiment adopts a pipeline configuration including a vertex pipeline VPL and a pixel pipeline PPL, and executes physical based rendering at high speed. The vertex pipeline VPL includes a vertex shader VS and a geometry shader GS. It should be noted that a configuration not using the geometry shader GS is also possible.

The vertex shader VS converts the coordinates on the print medium of the vertex of the print medium, which is a 3D object, into the coordinates of the 3D space to be rendered. Comprehensively, the coordinate conversion includes coordinate conversion such as coordinates of a model (here, the print medium) to be rendered→world coordinates→view (camera) coordinates→clip coordinates, but conversion to view coordinates and the like is performed by the geometry shader GS. In addition, the vertex shader VS performs shading, calculation of texture coordinates (UV), and the like. In these processes, the vertex shader VS and the geometry shader GS refer to 3D object information TOI, camera information CMR, lighting information LGT, background information BGD, and the like stored in the first storage section 131.

The 3D object information TOI is information relating the shape and the like of the 3D object placed in the virtual space. The 3D object is composed of a plurality of polygons and expresses the shape of the print medium. Since the surface of an actual print medium has minute irregularities that affects the texture of the print medium, it is desirable that the minute irregularities be expressed on the surface of the 3D object. However, if each polygon constituting the 3D object is made small in order to express minute irregularities, the number of polygons becomes enormous, and the calculation load becomes large. For this reason, a normal line map or a height map may be used in order to express minute irregularities on the 3D object. The normal line map and the height map are included in texture parameters (to be described later). The camera information CMR is information representing the position and orientation of the camera in the virtual space. The lighting information LGT includes at least one of information such as a position, an angle, a strength, and a color temperature of the light source in the virtual space. Note that the plurality of light sources may be disposed in the virtual space, and in this case, the influences of the plurality of light sources may be separately calculated and superimposed on the 3D object.

The background information BGD does not have to be used for rendering, but is information for expressing the background in the virtual space. The background information BGD includes information of objects such as a wall, a floor, and a furniture disposed in the virtual space, and these objects are targets of rendering by the rendering execution section 121, similarly to the print medium. In addition, since the lighting lights the print medium by lighting these background objects, it is also treated as part of the information about lighting. By performing rendering using such various kinds of information, a three dimensional preview becomes possible. The vertex information calculated by the vertex shader VS is passed to the geometry shader GS.

The geometry shader GS is used to process a set of vertex in the 3D object. By the geometry shader GS, it is possible to increase or decrease the number of vertices at the time of execution and to change the type of primitive constituting the 3D object. An example of increasing or decreasing the number of vertices is a culling process. In the culling process, vertices that do not appear on the camera are excluded from the processing target from the position and the direction of the camera. The geometry shader GS also performs a process such as generating a new primitive from existing primitives such as points, lines, and triangles. From the vertex shader VS, the geometry shader GS inputs the primitive having information of the entire primitive or a neighboring primitive. The geometry shader GS processes the input primitive and outputs the primitive to be rasterized.

The output of the vertex pipeline VPL, specifically, the primitive processed by the geometry shader GS, is rasterized by the rasterizer RRZ, generated in pixel units of data, and passed to the pixel pipeline PPL. The pixel pipeline PPL includes in the present embodiment a pixel shader PS and a render backend RBE.

The pixel shader PS manipulates the rasterized pixels and, in short, calculates the color for each pixel. Based on the information input from the vertex shader VS and the geometry shader GS, the process of synthesizing the texture and the process of applying a surface color are performed. The pixel shader PS maps the managed image data MGP, which is obtained by converting the image data ORG by CMS 111 based on the various profiles, on the print medium as the 3D object. At this time, the lighting process function provided in the pixel shader PS performs a lighting process based on the light reflection model of the object, the lighting information LGT described above, and a texture parameter TXT, which is one of the second data SD stored in the second storage section 132, and performs mapping of the managed image data MGP. The reflection model used in the lighting process is one of arithmetic equations of a mathematical model for simulating a lighting phenomenon in the real world. The reflection model used in this embodiment will be described in detail later.

In the process of manipulating pixels, when the number of pixels after rasterization increases, for example, when the output resolution is high, a high load is imposed, and the process takes time. Therefore, as compared with a process in vertex units, the process takes time and the efficiency of the pipeline process may be insufficient. In the present embodiment, the processing program of the pixel shader PS is optimized for execution by a GPU having high parallel processing performance, thereby realizing advanced effects including expression of texture in a short time.

It is determined by the render backend RBE as to whether or not the pixel information obtained by the process of the pixel shader PS is to be further rendered in the display frame memory FM. The pixel data is stored as having been rendered, only when the render backend RBE determines that the pixel data may be written into the frame memory FM without problems. As a test used for the rendering determination, there are known "alpha test", "depth test", "stencil test", and the like. The render backend RBE executes the set test among such tests and writes pixel data into the frame memory FM.

The rendering pipeline process is completed by the above process, and then the post processing section PST performs process for improving the appearance on the data stored in the frame memory FM. Such a process includes, for example, an anti-aliasing process for smoothing an image by removing unnecessary edges of the image and the like. In addition, there are processes such as ambient occlusion, screen space reflection, and depth of field, and the post processing section PST may be configured to perform necessary post process.

Figure 4:
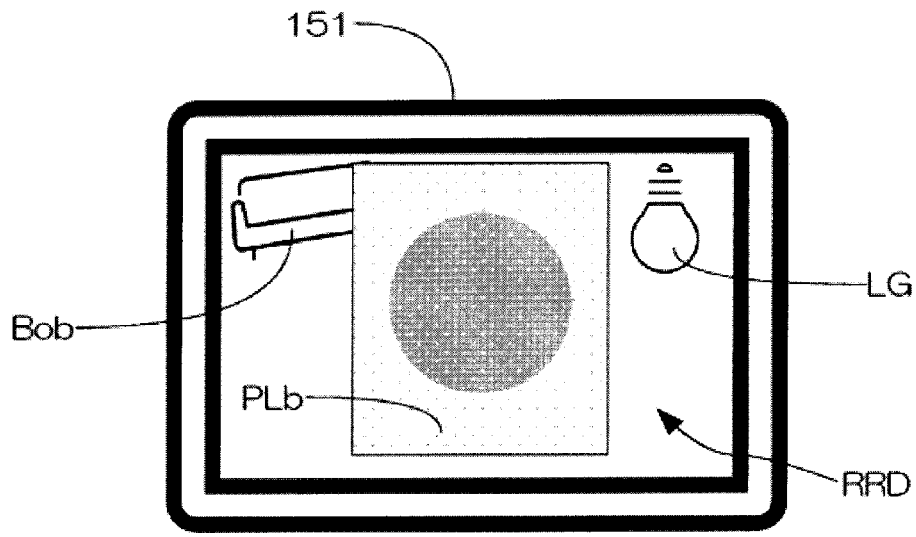
FIG. 4 is an explanatory diagram schematically showing a display example of a print medium on which an image is printed.

When the rendering execution section 121 performs the above processes, rendering is completed, and the result is output as a render result RRD. In practice, the data written in the frame memory FM is read in accordance with the display cycle of the image display section 151, and is displayed as the rendering result RRD. An example of the render result RRD is exemplified in FIG. 4. In this example, a print medium PLb as a 3D object, a light source LG, and a background object Bob, such as piece of furniture existing as one of backgrounds, are placed in the virtual space and displayed on the image display section 151.

Figure 5:
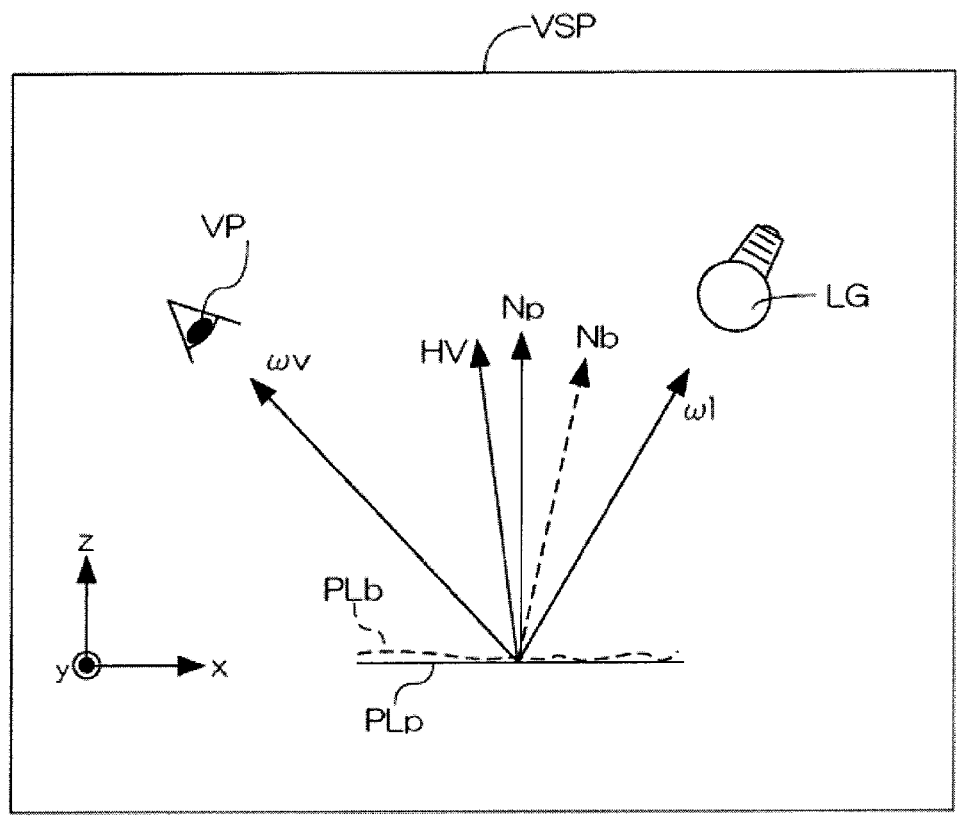
FIG. 5 is an explanatory diagram showing the relationship between a light source or viewpoint and angle of the plane of the 3D object.

The relationship between the print medium PLb placed in the virtual space and the light source LG or the viewpoint (camera) VP is exemplified in FIG. 5, exemplify. Although the relationship between the light source LG or the viewpoint VP and the print medium PLb is three dimension in the virtual space VSP, the figure shows the virtual space VSP on an x-z plane. x is a coordinate of a point at which vectors described below are gathered. With respect to a predetermined coordinate x of the print medium PLb, which is the target of rendering, a positional relationship between the light source LG which irradiates this with light and the viewpoint VP is exemplified. In the figure are shown a light source direction vector col from the coordinate x toward the light source LG, a viewpoint direction vector ωv from the coordinate x toward the viewpoint VP, and a half vector HV of both. A reference symbol Np indicates a normal line vector in a case where the print medium PLb is assumed to be a perfect plane PLp, and a reference symbol Nb indicates a normal line vector at the coordinate x of the actual print medium PLb, which is not a perfect plane. Note that FIG. 4 exemplifies the rendering result of the print medium PLb on the assumption that the viewpoint VP (camera) exists substantially in front of the print medium PLb.

Figure 6:
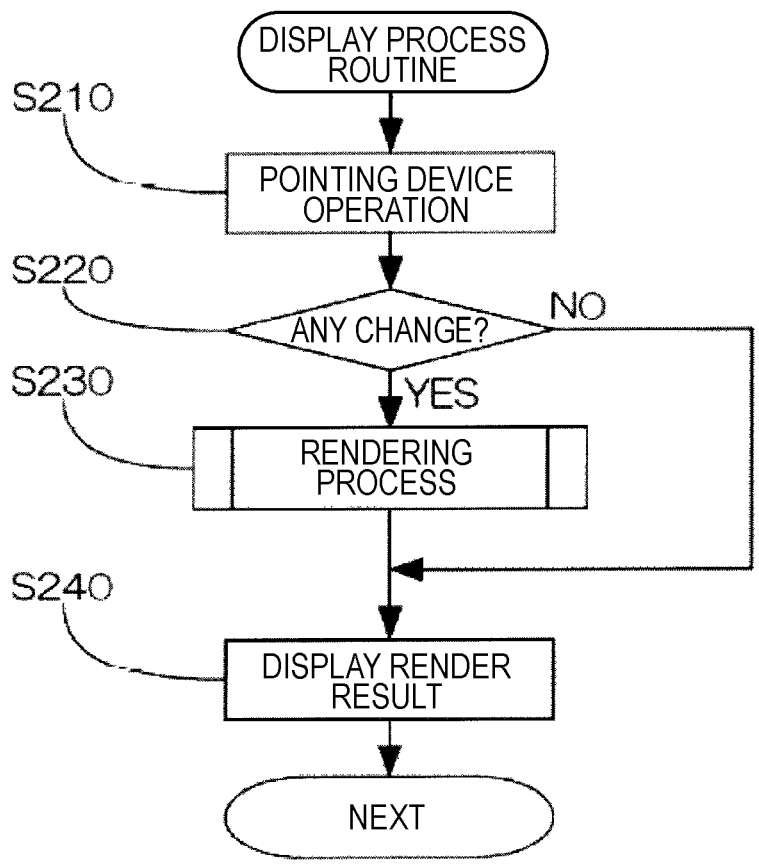
FIG. 6 is a flowchart showing a display process routine.

In the image processing device 100 of the present embodiment, the position and angle of the print medium in the virtual space can be freely changed, and the appearance can be confirmed together with the image on the print medium. This is because, as shown in FIG. 6, a pointing device is operated with respect to the image displayed on the image display section 151 (step S210), and if there is a change in an instruction by the pointing device (step S220:"YES"), and the image processing device 100 repeats a series of process in which the rendering process by the rendering execution section 121 is performed again (step S230), and the processing result is displayed on the image display section 151 (step S240). Here, the pointing device may be a 3D mouse, a tracking ball, or the like, or may be of a type in which a multi-touch panel provided on the image display section 151 is operated with a finger or a touch pen. For example, when a multi-touch panel is provided on the surface of the image display section 151, the print medium PLb or the light source LG may be directly moved by a finger or the like, or the print medium PLb may be rotated or the distance between the light source LG and the print medium PLb may be three dimensionally changed by using two fingers.

Figure 7:
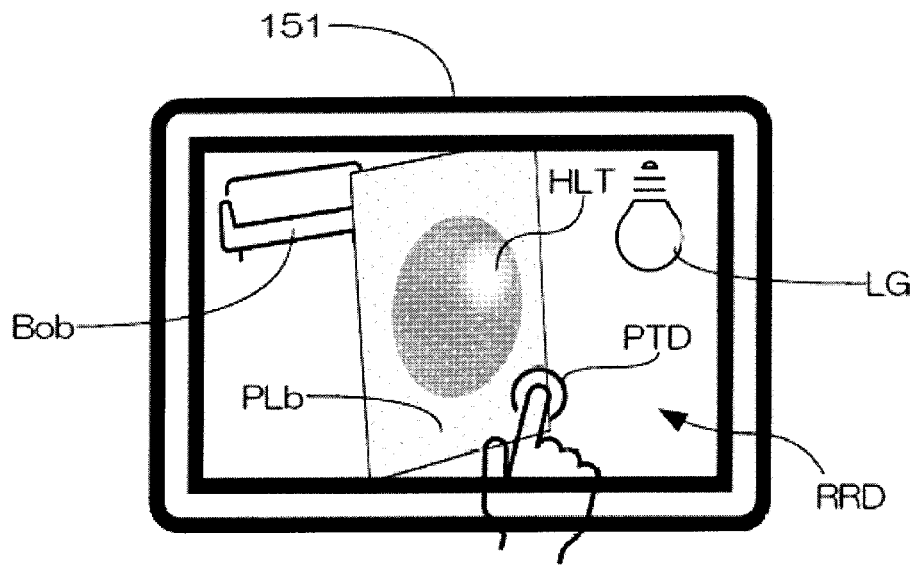
FIG. 7 is an explanatory diagram schematically showing a state in which the display of the print medium changes due to a change in an angle of a surface of the print medium on which the image is formed with respect to the light source.

The rendering execution section 121 performs the rendering process each time the position, the angle, or the like of the print medium PLb or the light source LG in such a virtual space is changed and displays the rendering result RRD on the image display section 151. An example of such a display is shown in FIG. 7. As shown in the figure, when the position, the angle, and the like of the print medium PLb and the light source LG in the virtual space are changed, the print medium on which the image is printed is subjected to physical based rendering each time, and the actual print medium on which the image is printed is displayed in a state close to a state in which the print medium can be seen in the real space.

In particular, in the present embodiment, in addition to the conversion by the color management system (CMS) of the color of the image to be printed on the print medium into the color of the image to be actually printed, with respect to the lighting process at the time of rendering, because

[1] the print medium on which the image is to be printed is handled as a 3D object and

[2] the texture of the surface of the print medium is taken into consideration using the texture parameters TXT, the reproducibility of the print medium displayed on the image display section 151 is extremely high. Hereinafter, the processes [1] and [2] will be described.

About [1]

How the 3D object appears in the virtual space can be represented by using a bidirectional reflectance distribution function (BRDF) and the luminance of the reflection light, at each section of the object. The bidirectional reflectance distribution function BRDF indicates an angular distribution characteristic of reflected light when light is incident from a specific angle. The luminance is the brightness of the object. Both are also collectively referred to as an lighting model.

An example of the reflection model adopted in the present embodiment is shown below. The BRDF can be represented as a function f (x, ωl, ωv) and the luminance as a function L (x,ωv) by following equations (1) and (2), respectively.

$$f(x,\omega l,\omega v)=kD/\pi+kS*(F*D*V) \quad (1)$$

$$L(x,\omega l,\omega v)=f(x,\omega l,\omega v)*E\perp(x)*n\cdot\omega l \quad (2)$$

Wherein
x indicates in-plane coordinates,
ωv indicates viewpoint direction vector,
ωl indicates light source direction vector,
kD indicates diffuse albedo,
kS indicates specular albedo,
F indicates fresnel term,
D indicates normal line distribution function,
v indicates geometric damping term,
E⊥(x) indicates illuminance perpendicular incident on coordinate x, and
n indicates normal line vector.

The first term of the BRDF, kD/π, is a diffuse reflection component and is a Lambertian model. The second term is a specular reflection component and is the Cook-Torrance model. In equation (1), kD/π may be referred to as a diffuse reflection term, and kS*(F*D*V) may be referred to as a specular reflection term. Models and calculation methods of a Fresnel term F, a normal line distribution function D, and a geometric damping term V are known, and thus description thereof will be omitted.

As the BRDF, a function corresponding to a reflection characteristics of a surface of the 3D object or a purpose of rendering may be used. For example, a disney principled BRDF may be used. In the present embodiment, the BRDF is used as a function representing the reflection of light, but a bidirectional scattering surface reflectance distribution function BSSRDF may be used as a function representing the reflection of light.

As can be seen from the equations (1) and (2), the normal line vector n, the light source direction vector ωl, and the viewpoint direction vector ωv are necessary for the calculation of the reflection model. The print medium is handled as a 3D object composed of a plurality of minute polygons as the target of the rendering process, and the normal line vector n reflecting minute irregularities on the surface of the print medium are calculated from the normal line Np of the polygons and the normal line map (to be described later). Therefore, in the vertex pipeline VPL, the normal line Np of the polygons and the UV coordinates for determining the reference position of the normal line map are calculated and input to the pixel pipeline PPL together with the light source direction vector ωl and the viewpoint direction vector coy. In the pixel pipeline PPL, the pixel shader PS refers to the normal line map given as one of the texture parameters by using the UV coordinates, and calculates the normal line vector n from the value of the referred normal line map and the normal line Np of the polygons.

In the present embodiment, as described above, print medium on which the image is to be printed is handled as a 3D object, and physical based rendering is performed using the equations (1) and (2). As shown in FIG. 7, the light source direction vector ωl and the viewpoint direction vector ωv are calculated each time the user changes the position and the angle of the print medium PLb and the light source LG in the virtual space using the pointing device.

About [2]

In the present embodiment, the texture of the surface of the print medium is considered using the texture parameters TXT. As the texture parameters TXT, there are the following parameters, but it is not necessary to consider all of them, and at least one of the following parameters, for example, smoothness may be considered.

Smoothness S or Roughness R

Smoothness S is a parameter indicating the smoothness of the surface of the 3D objects. The smoothness S is generally specified in the range of values 0.0 to 1.0. The smoothness S has an influence on the normal line distribution function D and the geometric damping term V in the equation (1) of BRDF described above. When this value is large, the specular reflection becomes strong, and a glossy feeling is exhibited. Roughness R may be used instead of the smoothness S. Both can be converted as S=1.0−R.

Metallic M

Metallic M indicates the extent to which the surfaces of the 3D object are metallic. If the surface is highly metallic, the value of metallic M will be large. If the metallic M is large, the surface of the object is likely to reflect light from the surroundings, resulting in reflection that reflects the surrounding scenery, and the color of the object itself is likely to be hidden. Metallic M influences the Fresnel term F. The Fresnel term F can be represented by the following equation (3) by using the Schlick approximation.

$$F(\omega l, h) = F_0 + (1 - F_0)(1 - \omega l \cdot h)^5 \qquad (3)$$

Wherein h indicates a half vector of the viewpoint direction vector $\omega v$ and the light source direction vector $\omega l$ and $F_0$ indicates a specular reflectance at the time of perpendicular incidence. The specular reflectance $F_0$ may be directly designated as a color of a specular reflection light (specularColor), or may be given by equation (4) of linear interpolation (herein, denoted as a lerp function) using metallic M.

$$F_0 = \text{lerp}(0.04, tC, M) \qquad (4)$$

wherein tC indicates the color (albedoColor) of the texture of the 3D object.

Note that the value 0.04 in the equation (4) is a representative value of each of RGB indicating a general value of a non metal. The same applies to the color tC of the texture.

Normal Line Map

The normal line vectors of the minute irregularities on the surface of the print medium are represented in the normal line map. By associating (attaching) the normal line map to the 3D object, it is possible to apply normal line vectors of the minute irregularities of the surface of the print medium to the 3D object. The normal line map may affect the Fresnel term F, the normal line distribution function D, and the geometric damping term V of the BRDF. The normal line map can be generated from a general RGB image by a known technique, and there are persons who provide a service for generating the normal line map from an RGB image. Therefore, the user of the image processing device 100 can generate the normal line map by himself or herself, or can prepare the normal line map by using the above service.

Other Texture Parameters

Other parameters that can function as texture parameters include a specular reflection light color (specularColor) and a clear coat layer parameter indicating the presence or absence of a clear coat layer on the surface of the print medium, its thickness or transparency, and the like.

As described above, because

[1] treating the print medium on which the image is to be printed as the 3D object and

[2] taking into consideration the texture of the surface of the print medium using the texture parameters TXT, the image processing device 100 of the present embodiment can display the appearance of the print medium printed with the image on the image display section 151 with high flexibility and high reproducibility. As exemplified in FIG. 4, as viewed from the direction directly facing the print medium, the texture of the print medium surface and the sense of roughness caused by minute irregularities on the surface of the print medium appear, and as exemplified in FIG. 7, as the print medium is rotated and viewed from an oblique direction, the lighting by the light source LG is reflected glare on the surface of the print medium, and the highlighted portion HLT, which is generated as a result, appears. Note that a lighting light is not limited to lighting, such as a spotlight, directed directly at the print medium and includes sunlight, indirect lighting, and indirect light.

When glossy paper is observed with the naked eye, the glossy paper appears to be flat. However, when the glossy paper is observed from a normal reflection direction of a light reflected on the surface of the glossy paper, the shape of a highlight portion HLT appearing on the surface of the glossy paper looks wavy. Causes that look like this are, since minute irregularities of a base material of the glossy paper under the clear coat layer of the glossy paper appears under the above observation environment. In addition, in the glossy paper, the irregularities of the base material appears differently between the highlight portion HLT and other than the highlight portion HLT, the irregularities of the base material clearly appears in the highlight portion HLT and the irregularities of the base material does not clearly appear in other than the highlight portion HLT.

On the other hand, matte paper and plain paper are not provided with the clear coat layer, and the matte paper and the plain paper are lower in surface smoothness than the glossy paper, so that a specular reflection component is smaller than that of the glossy paper. Therefore, the highlight portion HLT does not appear clearly on the matte paper or the plain paper, and irregularities of the surface appear substantially uniformly. However, even in the matte paper and the plain paper, the appearance of the irregularities of the surface have angle dependence. Specifically, in the surface of the matte paper or the plain paper, under an observation environment in which the surface of the paper is observed from the normal reflection direction or under an observation environment in which light from the light source LG is vertically incident on the surface of the paper, the irregularities of the surface are unlikely to appear, and in other observation environments, the irregularities of the surface are likely to appear.

As described above, there is a difference in the manner in which the irregularities of the surface appear depending on the type of print medium. In the present embodiment, in a pixel pipeline PPL, the normal line map is attached to the 3D object and the strength of the application effect of the normal line map at each point on the 3D object is corrected, thereby reproducing the difference in the appearance of the irregularities for each type of print medium described above.

Figure 8:
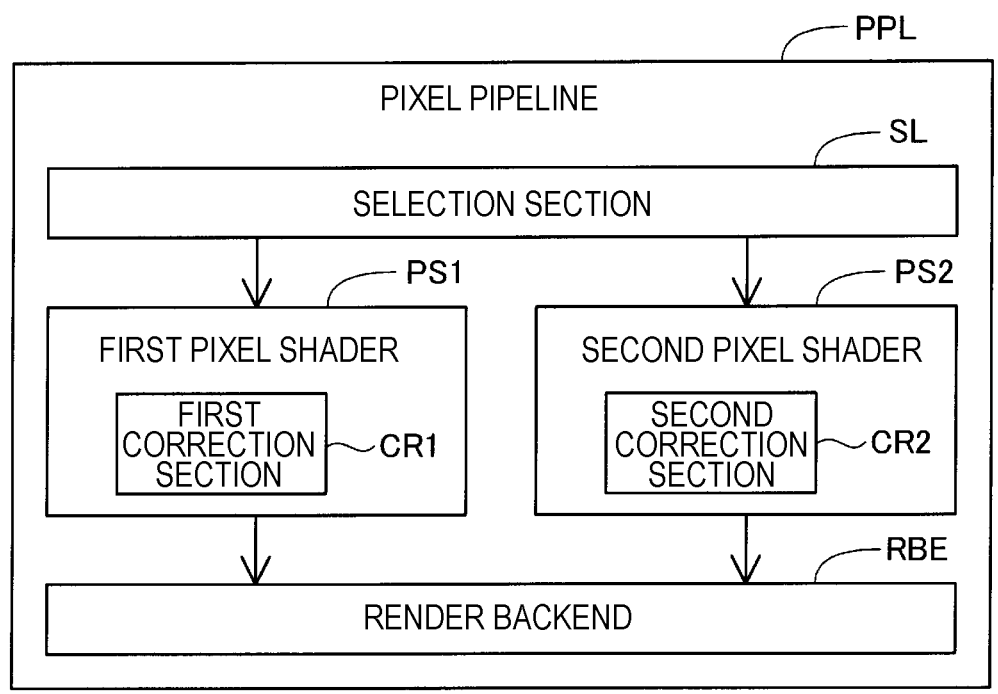
FIG. 8 is an explanatory diagram showing a configuration of a pixel pipeline.

FIG. 8 is an explanatory diagram showing a configuration of the pixel pipeline PPL. In the present embodiment, the pixel pipeline PPL includes a selection section SL, a first pixel shader PS1, a second pixel shader PS2, and the render backend RBE. The first pixel shader PS1 is provided with a first correction section CR1 and the second pixel shader PS2 is provided with a second correction section CR2. The first correction section CR1 and the second correction section CR2 each correct the strength of the application effect of the normal line map at each point on the 3D object. The first correction section CR1 and the second correction section CR2 have different correction method of the strength of the application effect of the normal line map. The selection section SL selects one process to be executed from the first pixel shader PS1 and the second pixel shader PS2, thereby selecting a correction method of the strength of the application effect of the normal line map. Information from one of the first pixel shader PS1 and the second pixel shader PS2 that has executed the process is input to the render backend RBE.

In the present embodiment, the selection section SL selects whether to correct the strength of the application effect of the normal line map by the first correction section CR1 of the first pixel shader PS1 or to correct the strength of the application effect of the normal line map by the second correction section CR2 of the second pixel shader PS2 according to the smoothness S included in the texture parameters. Specifically, the selection section SL causes the first correction section CR1 to execute correction when the smoothness S is equal to or greater than a threshold, and causes the second correction section CR2 to execute correction when the smoothness S is less than the threshold. The threshold is set to 0.5, for example. The smoothness S of the glossy paper is equal to or greater than the threshold, and the smoothness S of the matte paper or the plain paper is less than the threshold. Therefore, the correction method of the strength of the application effect of the normal line map is different between the glossy paper and the matte paper or the plain paper.

A description will be given of the correction method of the strength of the application effect of the normal line map by the first correction section CR1 of the first pixel shader PS1. The first correction section CR1 executes correction for the glossy paper. The first correction section CR1 first calculates provisional specular reflection component (ST=F*D*V) using a normal line vector Np of the polygon, and then calculates the normal line vector n used for calculation of the BRDF and the brightness using following equation (5).

$$n = \mathrm{lerp}(Np, Nb, \mathrm{saturate}(ST)) \tag{5}$$

wherein
n indicates a normal line vector used for calculation of the BRDF and the luminance,
Np indicates a normal line vector of the polygon,
Nb indicates a normal line vector of the normal line map, and
ST indicates a temporary specular reflection component.
lerp(Np, Nb, saturate (ST)) is a function that linear interpolation Np and Nb with saturate (ST).
saturate(ST) is a function that keeps ST between 0.0 and 1.0.
When 1.0<ST, saturate (ST)=1.0, and when 0. 0≤ST≤1. 0, saturate (ST)=St.

According to the equation (5), when the temporary specular reflection component exceeds 1.0, a direction of the normal line vector n matches the direction of the normal line vector Nb of the normal line map, and when the temporary specular reflection component is 0.0, the direction of the normal line vector n matches the direction of the normal line vector Np of the polygon. As the specular reflection component increases, the direction of the normal line vector n becomes closer to the direction of the normal line vector Nb of the normal line map, conversely, as the specular reflection component is closer to 0.0, the direction of the normal line vector n becomes closer to the direction of the normal line vector Np of the polygon. That is, the first correction section CR1 corrects the strength of the application effect of the normal line map, so that the application effect of the normal line map becomes stronger for a pixel having a larger specular reflection component, and the application effect of the normal line map becomes weaker for a pixel having a smaller specular reflection component. The strength of the application effect of the normal line map is also referred to as an application ratio of the normal line map. The application ratio of the normal line map is represented by a value of 0.0 to 1.0. As the application ratio of the normal line map becomes closer to 1.0, the direction of the normal line vector n becomes closer to the direction of the normal line vector Nb of the normal line map, and as the application ratio of the normal line map becomes closer to 0.0, the direction of the normal line vector n becomes closer to the direction of the normal line vector Np of the polygon. For example, when the application ratio of the normal line map is 0.0, the direction of the normal line vector n becomes the direction of the normal line vector Np of the polygon, and when the application ratio of the normal line map is 1.0, the direction of the normal line vector n becomes the direction of the normal line vector Nb of the normal line map. When the application ratio of the normal line map is 0.5, the direction of the normal line vector n is exactly an intermediate direction between the direction of the normal line vector Np of the polygon and the direction of the normal line vector Nb of the normal line map.

A description will be given of the correction method of the strength of the application effect of the normal line map by the second correction section CR2 of the second pixel shader PS2. The second correction section CR2 executes correction for the matte paper or the plain paper. The second correction section CR2 uses following equation (6) to calculate the normal line vector n used for the calculation of the BRDF and the luminance.

$$n = \mathrm{lerp}(Nb, Np, nh * nl) \tag{6}$$

wherein
n indicates a normal line vector used for calculation of the BRDF and the luminance,
Nb indicates a normal line vector of the normal line map,
Np indicates a normal line vector of the polygon,
nh indicates an inner product of the normal line vector Np of the polygon and the half vector HV, and
nl indicates an inner product of the normal line vector Np of the polygon and the light source direction vector ωl.
The nh*nl takes a value of 0.0 to 1.0.
lerp(Nb, Np, nh*nl) is a function for linear interpolation Nb and Np by nh*nl.

According to the equation (6), when the value of nh*nl is 1.0, the direction of the normal line vector n matches the direction of the normal line vector Np of the polygon, and when the value of nh*nl is 0.0, the direction of the normal line vector n matches the direction of the normal line vector Nb of the normal line map. As the value of nh*nl increases, the direction of the normal line vector n becomes closer to the direction of the normal line vector Np of the polygon, conversely, as the value of nh*nl approaches 0.0, the direction of the normal line vector n becomes closer to the direction of the normal line vector Nb of the normal line map.

As the angle formed by the normal line vector Np of the polygon and the half vector HV becomes smaller, the inner product nh of the normal line vector Np of the polygon and the half vector HV becomes larger. Therefore, as the angle formed by the normal line vector Np of the polygon and the half vector HV becomes smaller, the value of nh*nl becomes larger, and the application effect of the normal line map becomes weaker. That is, the second correction section CR2 corrects the strength of the application effect of the normal line map, so that the application effect of the normal line map becomes weaker for a pixel having angle formed by the normal line vector Np of the polygon and the half vector HV becomes smaller. As the angle formed by the normal line vector Np of the polygon and the half vector HV becomes smaller, the positional relationship between the viewpoint VP and the light source LG becomes closer to the positional relationship of the normal reflection. Therefore, when the correction is performed by the second correction section CR2, as the positional relationship between the viewpoint VP and the light source LG becomes closer to the positional relationship of the normal reflection, the application effect of the normal line map becomes weaker.

Further, as the angle formed by the normal line vector Np of the polygon and the light source direction vector DL becomes smaller, the inner product nl of the normal line vector Np of the polygon and the light source direction vector DL becomes larger. Therefore, as the angle formed by the normal line vector Np of the polygon and the light source direction vector DL becomes smaller, the value of nh*nl becomes larger, and the application effect of the normal line map becomes weaker. That is, the second correction section CR2 corrects the strength of the application effect of the normal line map, so that the application effect of the normal line map becomes weaker for a pixel having angle formed by the normal line vector Np of the polygon and the light source direction vector DL becomes smaller. The fact that the angle formed by the normal line vector Np of the polygon and the light source direction vector DL is small means a high degree of front facing between the surface PLp of the polygon and the light source LG. Therefore, when the correction is performed by the second correction section CR2, the application effect of the normal line map becomes weaker as the degree of front facing between the surface PLp of the polygon and the light source LG becomes higher.

Figure 9:
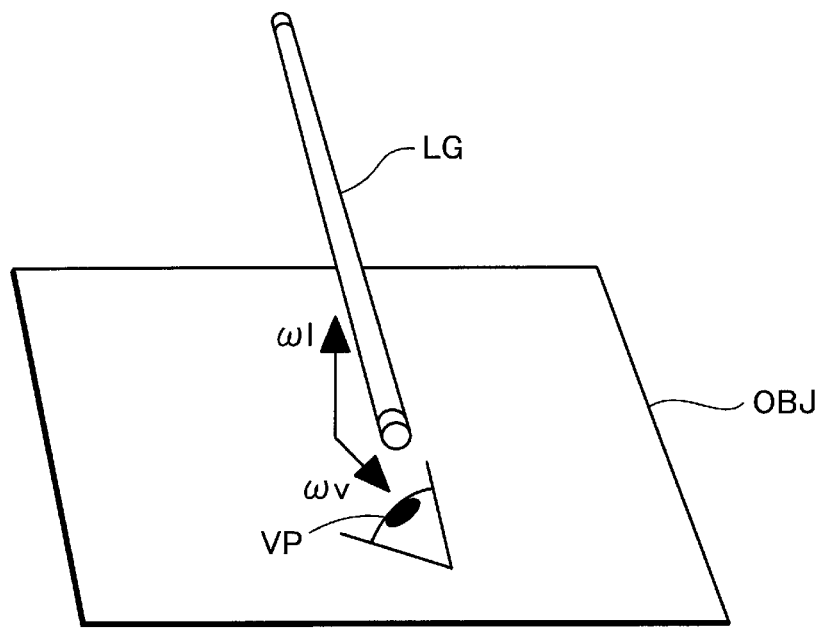
FIG. 9 is a perspective view showing an example of an observation environment.
Figure 10:
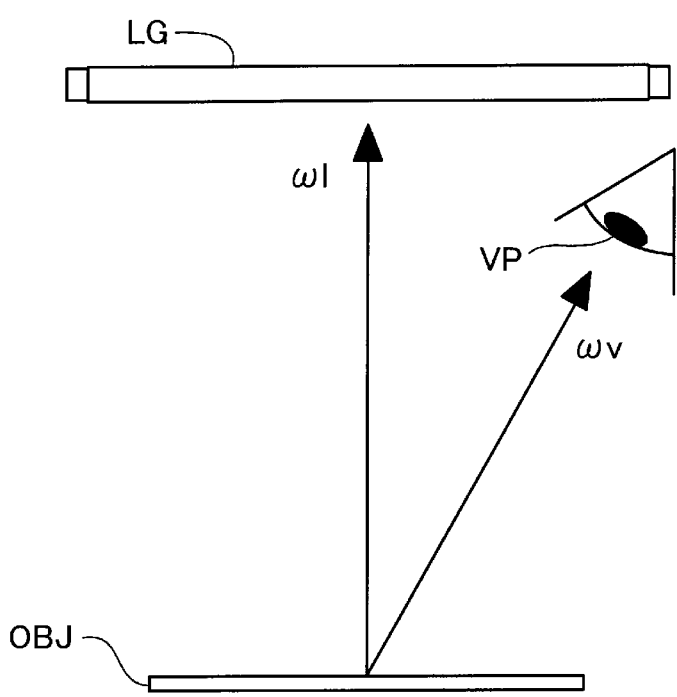
FIG. 10 is a side view showing an example of the observation environment.
Figure 11:
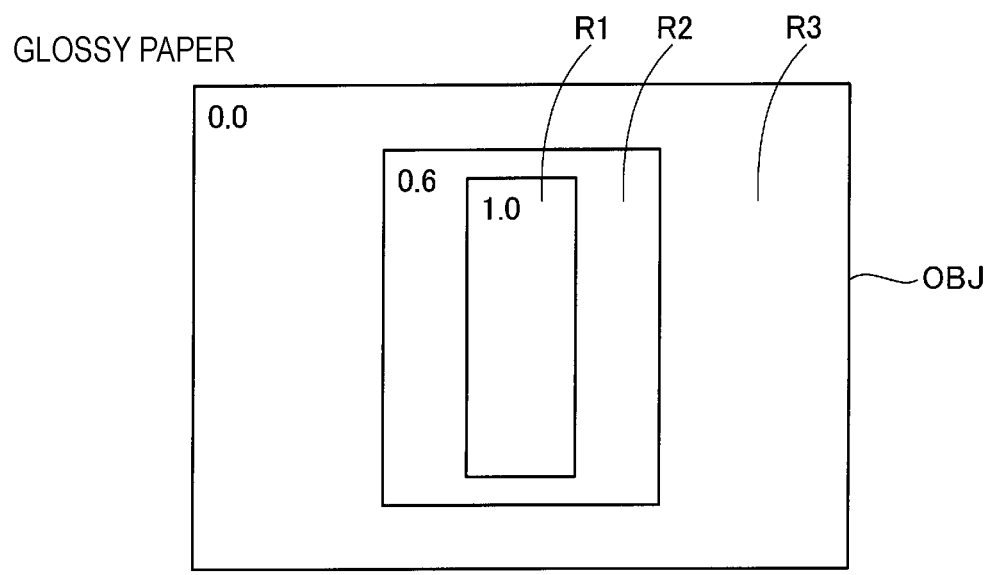
FIG. 11 is an explanatory diagram schematically showing the distribution of an application ratio of a normal line map in the case of glossy paper.
Figure 12:
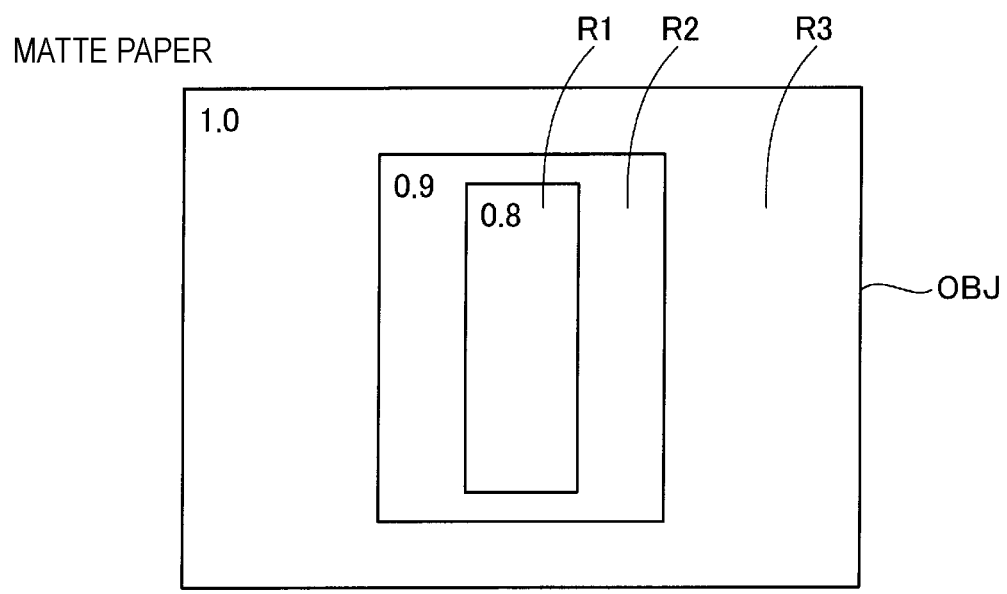
FIG. 12 is an explanatory diagram schematically showing the distribution of the application ratio of the normal line map in the case of matte paper.
Figure 13:
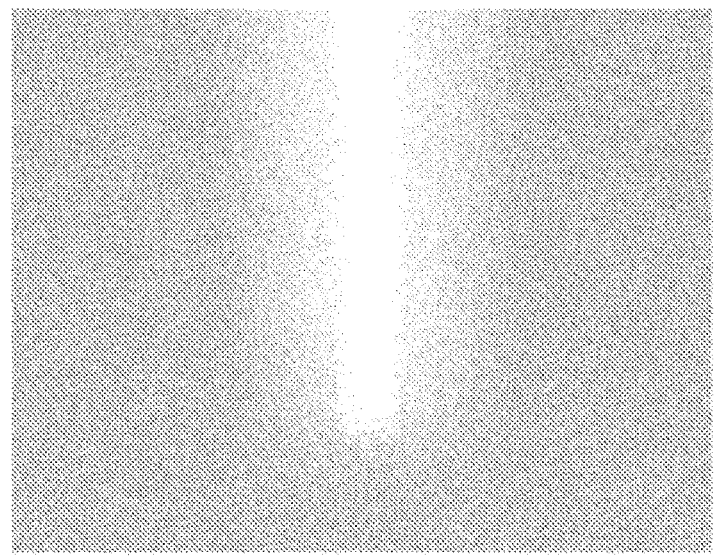
FIG. 13 is an explanatory diagram showing an example of a preview image in the case of the glossy paper.
Figure 14:
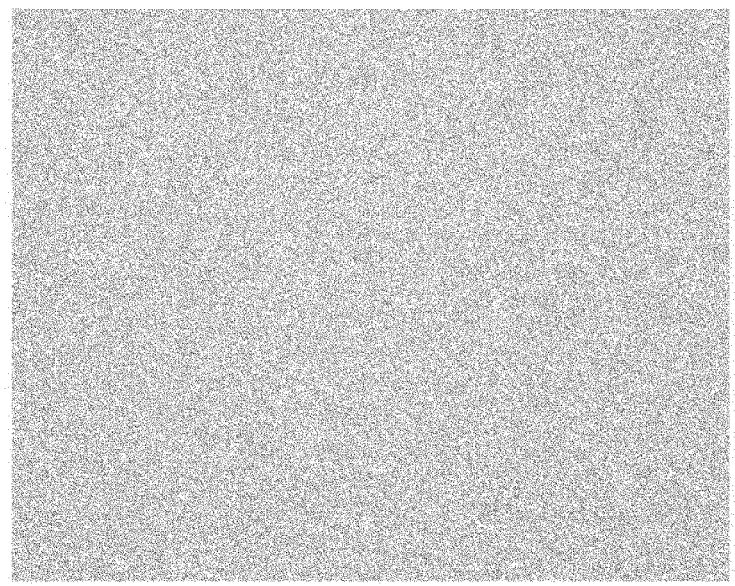
FIG. 14 is an explanatory diagram showing an example of a preview image in the case of the matte paper.

FIG. 9 is a perspective view showing an example of the observation environment. FIG. 10 is a side view showing an example of the observation environment. FIG. 11 is an explanatory diagram schematically showing the distribution of the application ratio of the normal line map in the case of the glossy paper, and FIG. 12 is an explanatory diagram schematically showing the distribution of the application ratio of the normal line map in the case of the matte paper. FIG. 13 is an explanatory diagram showing an example of a preview image in the case of the glossy paper, and FIG. 14 is an explanatory diagram showing an example of a preview image in the case of the matte paper. FIG. 9 and FIG. 10 show a state in which the 3D object OBJ lighting by the light source LG is observed from the viewpoint VP disposed obliquely above the 3D object OBJ. The 3D object OBJ represents the print medium placed on a flat surface such as a desk. The light source LG is disposed directly above the 3D object OBJ. The light source LG is a rod-shaped fluorescent lamp, and is disposed parallel to the surface of the 3D object OBJ. FIG. 12 and FIG. 14 show the preview images under the observation environment shown in FIGS. 9 and 10.

As shown in FIG. 11, in a case where the correction is performed by the first correction section CR1, the application ratio of the normal line map becomes higher in a pixel having a strong specular reflection component, that is, a pixel corresponding to the highlight portion. On the other hand, the application ratio of the normal line map becomes lower in a pixel having a small specular reflection component, that is, a pixel other than the highlight portion. In FIG. 11, a first region R1 at the center of the 3D object OBJ is the highlight portion, and the application ratio of the normal line map in the first region R1 is 1.0. The application ratio of the normal line map becomes lower as the distance from the first region R1 becomes larger, and the application ratio of the normal line map is 0.6 in a second region R2 surrounding the first region R1 and the application ratio of the normal line map is 0.0 in a third region R3 surrounding the second region R2. As a result, as shown in FIG. 13, the irregularities of the base material clearly appears in the highlight portion, and the irregularities of the base material does not clearly appear in the portions other than the highlight portion, which is a texture characteristic of the glossy paper. Further, when the position and orientation of the viewpoint VP, the position and orientation of the light sources LG, or the orientation of the 3D object OBJ is changed, the position at which the irregularities pattern appears changes.

As shown in FIG. 12, in a case where the correction is performed by the second correction section CR2, the application ratio of the normal line map becomes lower in the pixel having a strong specular reflection component, that is, the pixel corresponding to the highlight portion. In addition, as for a pixel of the degree of front facing between the surface PLp of the polygon of the 3D object OBJ and the light source LG becomes higher, the application ratio of the normal line map becomes lower. In FIG. 12, the first region R1 at the center of the 3D object OBJ is the highlight portion, and the application ratio of the normal line map in the first region R1 is 0.8. The application ratio of the normal line map becomes larger as the distance from the first region R1 becomes larger, and the application ratio of the normal line map is 0.9 in the second region R2 surrounding the first region R1 and the application ratio of the normal line map is 1.0 in third region R3 surrounding the second region R2. As a result, as shown in FIG. 14, the appearance of the irregularities of the surface are substantially uniform, and a texture characteristic of the matte paper or the plain paper is reproduced in which the irregularities of the surface are less likely to appear under an observation environment in which the surface of the paper is observed from the normal reflection direction or in which light from the light source LG is perpendicularly incident on the surface of the paper, and the irregularities of the surface are more likely to appear under other observation environments. Note that, in FIG. 11 and FIG. 13, the application ratio of the normal line map changes in three stages, but in actuality, the application ratio of the normal line map changes more finely.

According to the image processing device 100 of the present embodiment described above, since the rendering image is generated by executing the physical based rendering after correcting the strength of the application effect of the normal line map associated with the 3D object, the texture of the print medium can be reproduced without restricting the observation environment. In particular, in the present embodiment, the image processing device 100 uses a different correction method of the strength of the application effect of the normal line map depending on whether the smoothness S of the print medium is equal to or greater than the threshold or less than the threshold. Therefore, it is possible to realistically reproduce a texture specific to the glossy paper having a high smoothness S or a texture specific to the matte paper or the plain paper having a low smoothness S.

In the above described embodiment, two pixel shaders PS1 and PS2 are provided in the pixel pipeline PPL, but in another embodiment, the number of pixel shaders PS provided in the pixel pipeline PPL may be one. In this case, the correction section of the pixel shader PS may correct the strength of the application effect of the normal line map by following equation (7).

$$n = \text{lerp}(n1, n2, S) \qquad (7)$$

wherein n1 indicates the normal line vector calculated by the correction method when the smoothness S of the print medium is equal to or greater than the threshold, n2 indicates the normal line vector calculated by the method when the smoothness S of the print medium is less than the threshold, and S indicates the smoothness of the print medium.

This method also makes it possible to reproduce the difference between the texture of the glossy paper and the texture of the matte paper described above. When the number of pixel shaders PS provided in the pixel pipeline PPL is one, the selection section SL may not be provided.

B. Second Embodiment

Figure 15:
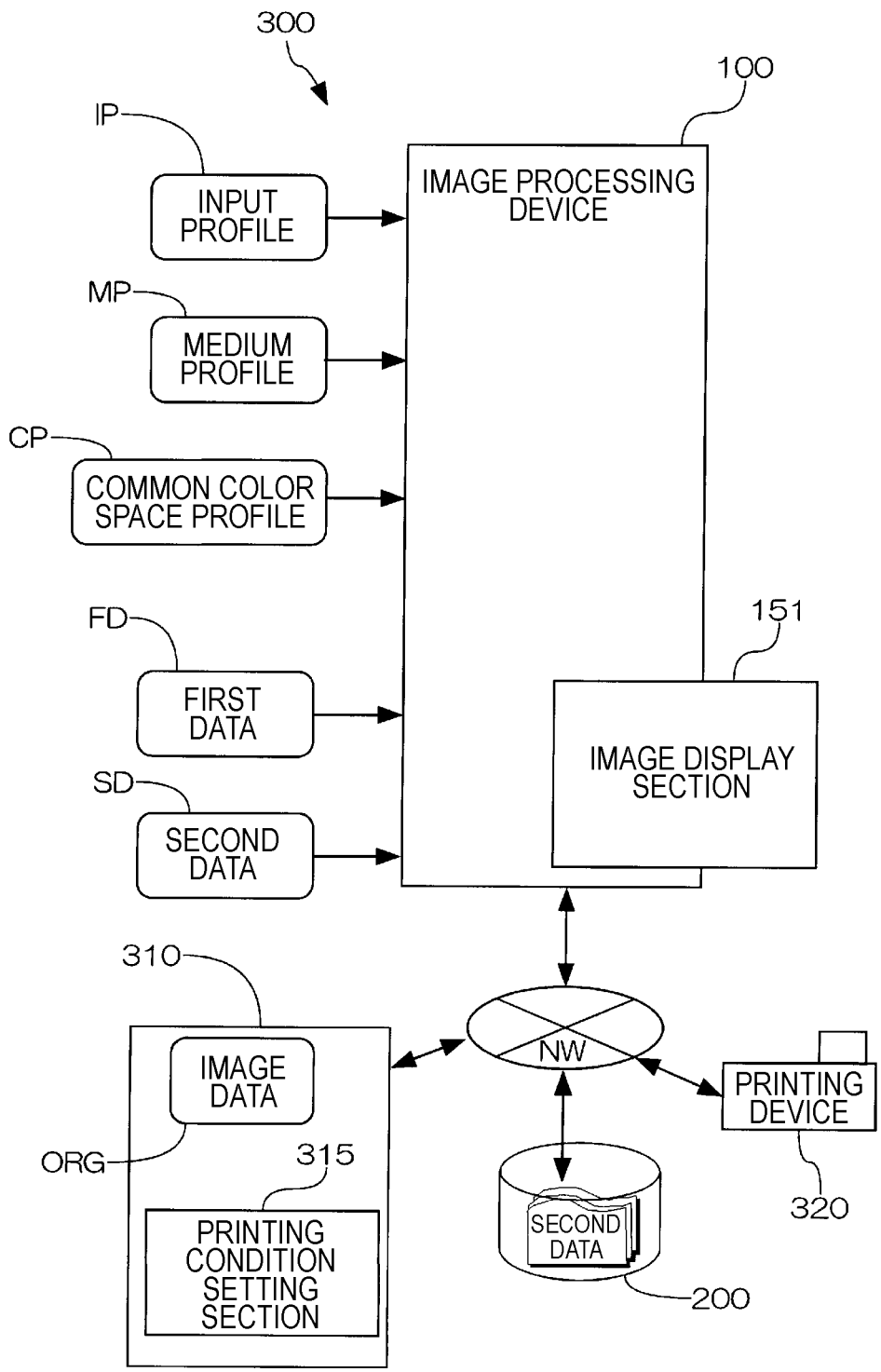
FIG. 15 is a schematic configuration diagram showing an embodiment as a printing system.

The second embodiment is an aspect as a printing system 300. As shown in FIG. 15, the printing system 300 includes the image processing device 100 described above, an image preparing device 310, and a printing device 320. The image preparing device 310 is a computer used by the user in the present embodiment, and is a device that prepares the image data ORG which is data of the image expressed in the first color space. This image preparing device 310 may have a function of creating the image, or may simply store the image data and provide it to the image processing device 100 as necessary. The image preparing device 310 is connected to the image processing device 100 via the network NW in the same manner as the site 200 so that the image processing device 100 can acquire the image data ORG, but may be directly connected to the image processing device 100 in a wired or wireless manner.

In the present embodiment, the printing device 320 is connected to the image preparing device 310 via the network NW, receives an instruction from the image preparing device 310, and prints the image data ORG output by the image preparing device 310 on the print medium PRM. The user of the printing system 300 causes the image processing device 100 to acquire the image data ORG prior to printing by the printing device 320, handles the print medium PRM as a 3D object as described in the first embodiment, performs the lighting process using the second data SD including the texture parameters, and renders the print medium PRM including the image printed thereon.

The user confirms the rendering result on the image display section 151, and if necessary, changes the viewpoint, the position of the light source, or the strength or the white balance of the light source to confirm the appearance of the print medium PRM, and then outputs the image data ORG from the image preparing device 310 to the printing device 320 via the network NW to print the image data ORG on the print medium PRM. Prior to printing, the user can check how the image on the print medium PRM appears by physical based rendering by the image processing device 100. As a result, it is possible to print the print medium PRM after confirming the difference in texture depending on the type of the print medium PRM, including the smoothness (roughness) or the like of the surface of the print medium PRM. It is also possible to change the color of the image data ORG, change the type of the print medium PRM to be used, change the printing device 320 to be used for printing, or change an ink set thereof so as to obtain a desired printing result by viewing the rendering result displayed on the image display section 151.

When the image processing device 100 is used together with the printing device 320, a printing condition setting section 315 which sets the printing conditions that affect the appearance of the image to be printed on the print medium on the print medium to the printing device 320, may be provided in the computer which issues the printing instruction, for example, the image preparing device 310 in the present embodiment. In this way, it is possible to set a profile required for color conversion from the printing conditions, for example, such as selection of a paper tray in which predetermined print medium is stored, selection of the ink set to be used, and selection of a type of the printing device to be used, and to determine the first and second data to be referred to based on the printing conditions, and various settings can be easily realized. In addition to these conditions, the printing condition setting section 315 may set an observation state of the print medium on which the image is printed in the virtual space, the information about lighting which is lighting information for the print medium in the virtual space, an object specifying information for specifying the 3D object in the virtual space, the background information for specifying the background in the virtual space, and the like.

Figure 16:
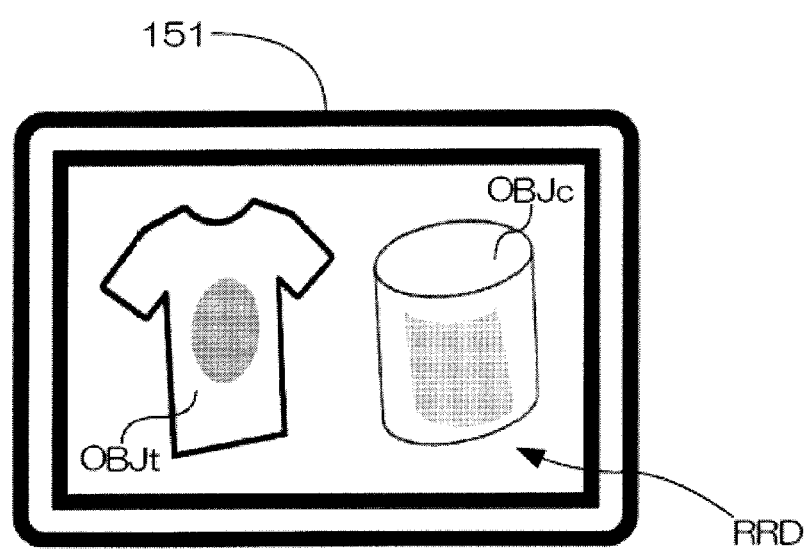
FIG. 16 is an explanatory diagram showing an example of how a print result of another print medium appears.

The print medium to be printed by the printing device 320 may be a medium other than a paper sheet. For example, the printing device may be a textile printer that performs printing on a fabric or a printing device that performs printing on a solid material such as a can or a bottle. In addition to a configuration in which printing is directly performed on the object, it is also possible to adopt a configuration of the printing device in which printing is performed on a transfer medium such as a transfer paper and ink formed on the transfer medium is transferred to the fabric or the solid material which is the print medium. As such a transfer-type printing device, there is a sublimation-type printing device. In such a transfer-type configuration, the print medium is a final printed product to which the image is transferred. In such a case, texture parameters and the like related to the structure and texture of the surface such as fabric, metal, glass, or plastic may be prepared in accordance with the properties of the print medium, and the image processing device 100 may perform physical based rendering. Also in the transfer-type printing device, the texture parameters represent the texture of the final printed product, not the transfer medium. FIG. 16 shows an example of display on the image display section 151 when printing is performed on such a fabric or can. In the figure, the object OBJt printed on a T-shirt and the object OBJc printed on the can are shown together for facilitate understanding, but normally, they are displayed one print medium at a time. Of course, a plurality of rendering execution sections may be provided, and a plurality of results of the physical based rendering may be simultaneously displayed.

C. Other Embodiments (1) The present disclosure may be implemented in the following forms.

One of the other embodiments is a form as an image processing device.

This image processing device includes an image data acquisition section configured to acquire image data of an image to be printed on a print medium; a parameter acquisition section configured to acquire parameters for performing physical based rendering of the print medium as a 3D object on which the image is to be printed, the parameters including a normal line map representing a normal line direction of an irregularities surface of the print medium related to a reflection direction of light incident on the print medium; a correction section configured to correct strength of an application effect of the normal line map corresponding to the 3D object; and a rendering execution section configured to, by executing the physical based rendering using the image data and the parameters, generate a rendering image representing the print medium on which the image is printed. In this way, since the rendering image is generated by executing the physical based rendering after correcting the strength of the application effect of the normal line map associated with the 3D object, the texture of the print medium can be reproduced without restricting the observation environment.

Such an image processing device may be configured as the device for performing only the image processing described above, or may be configured as a device including the function of storing the image to be printed. Alternatively, it may be configured as a device including a function of creating the image to be printed or a device for printing the image. The image processing device may be realized by a computer provided with a GPU, or may be configured as a distributed type system in which necessary functions are placed at a plurality of sites so as to cooperate with each other. When the system is configured as a distributed system, since the processing load of the terminal is reduced, it becomes easy to execute the image process even in a portable terminal such as the tablet, and the convenience of the user is further improved.

Various existing configurations can be adopted for such a rendering execution section. In general, rendering may be performed by dividing it into a plurality of elements such as viewpoint conversion for converting three dimensional world coordinates into a coordinate system viewed from the viewpoint, culling for removing vertex unnecessary for rendering from the 3D object, clipping for removing invisible coordinates, and rasterization. These processes configured to be suitable for the process in the dedicated GPU, and may be realized by the pipeline configuration including the vertex pipeline that performs the process related to the vertex of the 3D object and the pixel pipeline that performs the process related to each rasterized pixel.

(2) Such a configuration may be such that the parameters include smoothness of a surface of the print medium relating to dispersion of the reflection direction of light incident on the print medium.

In this way, since the texture corresponding to the smoothness of the surfaces of the print medium can be given to the 3D object, the texture of the 3D object represented in the rendering image can be made closer to the texture of the actual print medium.

(3) The configuration of the above (2) may be such that the correction section is configured to correct the strength of the application effect of the normal line map in accordance with the smoothness.

In this way, since the strength of the application effect of the normal line map is corrected in accordance with the smoothness of the print medium, the texture of the 3D object represented in the rendering image can be brought closer to the texture of the actual print medium.

(4) The configuration of the above (2) and (3) may be such that the correction section is configured to, when the smoothness is equal to or greater than a predefined value, perform correction such that the application effect of the normal line map becomes larger in correspondence with increase in a specular reflection component of a function representing reflection of light.

In this way, for example, when the printing medium with high smoothness such as the glossy paper is reproduced by the 3D object, the texture of the 3D object can be made close to the texture of the actual printing medium.

(5) The configuration of the above (2) to (4) may be such that the correction section is configured to, when the smoothness is less than a predefined value, perform correction such that the application effect of the normal line map becomes weaker in correspondence with decrease in an angle between a polygon normal line, which is a normal line of a polygon constituting the 3D object, and a half vector between a light source direction vector and a viewpoint direction vector.

In this way, for example, when the printing medium with low smoothness such as the matte paper and the plain paper are reproduced by the 3D object, the texture of the 3D object can be made close to the texture of the actual printing medium.

(6) The configuration of the above (2) to (5) may be such that the correction section is configured to, when the smoothness is less than a predefined value, perform correction such that the application effect of the normal line map becomes weaker in correspondence with decrease in an angle between a polygon normal line, which is a normal line of a polygon constituting the 3D object, and the light source direction vector.

In this way, for example, when the printing medium with low smoothness such as the matte paper and the plain paper are reproduced by the 3D object, the texture of the 3D object can be made close to the texture of the actual printing medium.

(7) The configuration of the above (2) to (6) may be such that the correction section is configured to, when the smoothness is less than a predefined value, perform correction such that the application effect of the normal line map becomes weaker in correspondence with decrease in an angle between a polygon normal line, which is a normal line of a polygon constituting the 3D object, and a half vector between a light source direction vector and a viewpoint direction vector, and the application effect of the normal line map decreases in correspondence with decrease in an angle between the polygon normal and the light source direction vector.

In this way, for example, when the printing medium with low smoothness such as the matte paper and the plain paper are reproduced by the 3D object, the texture of the 3D object can be made close to the texture of the actual printing medium.

(8) The configuration of the above (2) to (7) may be such that a plurality of correction sections are provided with different methods for correcting the strength of the application effect of the normal line map and the image processing device further includes a selection section configured to select, in accordance with the smoothness, a correction section of the plurality of correction sections to execute correction of the strength of the application effect of the normal line map.

In this way, it is possible to easily switch the correction method of the strength of the application effect of the normal line map according to the smoothness of the print medium.

(9) The configuration of the above (1) to (8) may be such that the correction section is provided in a shader for applying a shade to the 3D object in the physical based rendering.

In this way, since the strength of the application effect of the normal line map can be corrected in the shader that applies the shade to the 3D object, the strength of the application effect of the normal line map can be corrected and the shade applied to the 3D object can be changed every time the light source, the viewpoint, and the position and orientation of the 3D object are changed.

(10) As another embodiment of the present disclosure, a configuration as a printing system is possible.

This printing system includes the image processing device according to any one of the above (1) to (9); a display section configured to display the rendering image generated by the image processing device; and a printing device configured to print the image data.

In this way, since the appearance of the print medium on which the image is printed is displayed on the display section prior to the printing when the printing is performed by the printing device, the printing can be performed after confirming this. Therefore, it is possible to suppress the occurrence of a difference between the image to be printed and the impression of the print medium, to reduce the repetition of the trial and error by adjusting the original image or the printing conditions, and to reduce the cost and time while attempting to print.

(11) Another configuration of the present disclosure is a configuration as the image processing program.

This image processing program causes the computer to perform the following functions:

a function of obtaining image data of an image to be printed on a print medium; a function of acquiring parameters for performing physical based rendering of the print medium as a 3D object on which the image is to be printed, the parameters including a normal line map representing a normal line direction of an irregularities surface of the print medium related to a reflection direction of light incident on the print medium; a function of correcting strength of an application effect of the normal line map corresponding to the 3D object; and a function of, by executing the physical based rendering using the image data and the parameters, generating a rendering image representing the print medium on which the image is printed. In this way, the functions as the image processing device described in (1) to (9) can be easily provided to the device provided with the computer.

(12) In each of the above described embodiments, a part of the configuration realized by hardware may be replaced by software. At least a part of the configuration realized by software can also be realized by a discrete circuit configuration. In a case where some or all of the functions of the present disclosure are realized by software, the software (computer program) can be provided in a form stored in a computer-readable recording medium. The "computer-readable recording medium" is not limited to a portable recording medium such as a flexible disk or a CD-ROM, and also includes an internal storage device in a computer such as various RAMS or ROMs, or an external storage device fixed to a computer such as a hard disk. That is, the "computer-readable recording medium" has a broad meaning including an arbitrary recording medium capable of fixing a data packet not temporarily.

The present disclosure is not limited to the above described embodiments, and can be realized by various configurations without departing from the scope of the present disclosure. For example, the technical features in the embodiments corresponding to the technical features in the aspects described in the summary of the disclosure can be appropriately replaced or combined in order to solve a part or all of the problems described above or in order to achieve a part or all of the effects described above. If a technical feature is not described as an essential feature in the present specification, the technical feature can be deleted as appropriate.

What is claimed is:

1. An image processing device comprising:
an image data acquisition section configured to acquire image data of an image to be printed on a print medium;
a parameter acquisition section configured to acquire parameters for performing physical based rendering of the print medium as a three dimensional (3D) object on which the image is to be printed, the parameters including a normal line map representing a normal line direction of an irregularities surface of the print medium related to a reflection direction of light incident on the print medium;
a correction section configured to correct strength of an application effect of the normal line map corresponding to the 3D object; and
a rendering execution section configured to, by executing the physical based rendering using the image data and the parameters, generate a rendering image representing the print medium on which the image is printed.

2. The image processing device according to claim 1, wherein
the parameters include smoothness of a surface of the print medium relating to dispersion of the reflection direction of light incident on the print medium.

3. The image processing device according to claim 2, wherein
the correction section is configured to correct the strength of the application effect of the normal line map in accordance with the smoothness.

4. The image processing device according to claim 2, wherein
the correction section is configured to, when the smoothness is equal to or greater than a predefined value, perform correction such that the application effect of the normal line map becomes larger in correspondence with increase in a specular reflection component of a function representing reflection of light.

5. The image processing device according to claim 2, wherein
the correction section is configured to, when the smoothness is less than a predefined value, perform correction such that the application effect of the normal line map becomes weaker in correspondence with decrease in an angle between a polygon normal line, which is a normal line of a polygon constituting the 3D object, and a half vector between a light source direction vector and a viewpoint direction vector.

6. The image processing device according to claim 2, wherein
the correction section is configured to, when the smoothness is less than a predefined value, perform correction such that the application effect of the normal line map becomes weaker in correspondence with decrease in an angle between a polygon normal line, which is a normal line of a polygon constituting the 3D object, and the light source direction vector.

7. The image processing device according to claim 2, wherein
the correction section is configured to, when the smoothness is less than a predefined value, perform correction such that the application effect of the normal line map becomes weaker in correspondence with decrease in an angle between a polygon normal line, which is a normal line of a polygon constituting the 3D object, and a half vector between a light source direction vector and a viewpoint direction vector, and the application effect of the normal line map decreases in correspondence with decrease in an angle between the polygon normal and the light source direction vector.

8. The image processing device according to claim 2, wherein a plurality of correction sections are provided with different methods for correcting the strength of the application effect of the normal line map and the image processing device further includes a selection section configured to select, in accordance with the smoothness, a correction section of the plurality of correction sections to execute correction of the strength of the application effect of the normal line map.

9. The image processing device according to claim 1, wherein the correction section is provided in a shader for applying a shade to the 3D object in the physical based rendering.

10. A printing system comprising:

the image processing device according to claim 1;

a display section configured to display the rendering image generated by the image processing device; and a printing device configured to print the image data.

11. A non-transitory computer-readable storage medium storing an image processing program implemented by a computer, the program comprising:

a function of obtaining image data of an image to be printed on a print medium;

a function of acquiring parameters for performing physical based rendering of the print medium as a three dimensional (3D) object on which the image is to be printed, the parameters including a normal line map representing a normal line direction of an irregularities surface of the print medium related to a reflection direction of light incident on the print medium;

a function of correcting strength of an application effect of the normal line map corresponding to the 3D object; and a function of, by executing the physical based rendering using the image data and the parameters, generating a rendering image representing the print medium on which the image is printed.

* * * * *